United States Patent [19]

Kanter et al.

[11] Patent Number: 4,818,355

[45] Date of Patent: Apr. 4, 1989

[54] METHOD AND APPARATUS FOR REMOVING POLYCYCLIC AROMATIC HYDROCARBONS FROM THE EXHAUST OF A MUNICIPAL WASTE INCINERATOR

[75] Inventors: Ira E. Kanter, Monroeville; Pang K. Lee, Murrysville, both of Pa.

[73] Assignee: Westinghouse Electric Corp., Pittsburgh, Pa.

[21] Appl. No.: 43,576

[22] Filed: Apr. 27, 1987

[51] Int. Cl.$^4$ ................................................ C07C 3/24
[52] U.S. Cl. .................................... 204/170; 204/166; 422/186.04; 422/907
[58] Field of Search ............... 204/165, 164, 168, 169, 204/170; 422/186.21, 186.23, 186.04, 186.28, 907

[56] References Cited

U.S. PATENT DOCUMENTS

| | | | |
|---|---|---|---|
| 3,706,182 | 12/1972 | Sargent | 422/186.21 |
| 3,875,034 | 4/1975 | Adams et al. | 204/165 |
| 3,898,468 | 8/1975 | Guerin . | |
| 4,644,877 | 2/1987 | Barton et al. | 204/165 |
| 4,655,932 | 4/1987 | Roslonski | 204/165 |
| 4,657,738 | 4/1987 | Kanter et al. | 422/186.21 |

FOREIGN PATENT DOCUMENTS 3608291  4/1987  Fed. Rep. of Germany .

OTHER PUBLICATIONS

McGraw-Hill Dictionary of Scientific and Technical Terms 3rd ed. p. 688.
Chemical Abstracts, vol. 97, No. 24, Dec. 13, 1982, (Columbus, Ohio, US), "Decomposition of PCB's in the Radio-Frequency Glow Discharge Plasmas of Oxygen, Hydrogen, and Water Vapor," K. Hiraoka et al., see 300, Abstract 202764r, & Can. J. Chem. 1982, 60(22), 2876–2882.
McGraw-Hill Encyclopedia of Science and Technology 6th ed. vol. 3 p. 71.
McGraw-Hill Encyclopedia of Science and Technology 6th ed. vol. 7 pp. 561–562.
Chemical Abstracts, vol. 97, No. 13, Sep. 27, 1982, (Columbus, Ohio, US), "Reaction of Hydrogen with Aromatic Compounds in a 13.6-MHz Discharge", by P.W. Schmalzl et al., see p. 553, abstract 109379j, & Plasma Chem. Plasma Process, 1982, 2(1), 43–59.
Chemical Abstracts, vol. 95, No. 19, Nov. 9, 1981, (Columbus, Ohio, US), "Oxidation by Means of Plasma Reactions", by M. Tezuka, see p. 629, abstract 167912x, & Kagaku Kogyo, 1981, 32(9), 938–943.

*Primary Examiner*—John F. Niebling
*Assistant Examiner*—Steven P. Marquis

[57] ABSTRACT

A system for decomposing aromatic hydrocarbons, such as furans, dioxins and PCBs, uses a glow discharge device as an electrochemical reactor. A gas, containing an aromatic hydrocarbon, is supplied at approximately atmospheric pressure to the glow discharge device which includes a pair of electrodes separated by a gap. The gas flows through the gap between the electrodes, one of which is preferably a planar electrode and the other of which is preferably a plurality of pins arranged perpendicular to the planar electrode. The electrodes are connected to a direct current power source via a ballast. The electrical potential across the electrodes is adjusted in conjunction with the flow rate to provide sufficient energy to break the benzene rings in the aromatic hydrocarbon, while preventing arcing across the electrodes.

2 Claims, 4 Drawing Sheets

METHOD AND APPARATUS FOR REMOVING POLYCYCLIC AROMATIC HYDROCARBONS FROM THE EXHAUST OF A MUNICIPAL WASTE INCINERATOR

BACKGROUND OF THE INVENTION

2. Field of the Invention

The present invention is related to removing pollutants from exhaust gases and, more particularly, to removing chlorinated polycyclic aromatic hydrocarbons from an exhaust gas such as that produced by a municipal solid waste incinerator.

2. Description of the Related Art

Within the last one to two decades, toxic substances such as dioxins and furans have been found in the exhausts of municipal solid waste incinerators. In addition, these substances as well as polychlorinated biphenyls (PCBs), are often present at toxic waste sites. Disposal of such substances which are present in exhaust gases and at toxic waste sites, as well as under other circumstances, is a serious problem because these substances are toxic, even in minute amounts, and are very stable. Therefore, some means for decomposing such substances and creating nontoxic byproducts is much sought after.

Over the last two decades several studies have been conducted which indicate that many of the toxic substances identified in the exhaust of municipal waste incinerators are broken down at temperatures somewhere between 600° C. and 1300° C. provided they are exposed to such temperatures for a minimum period of time which may be as long as 2 and one-half seconds. All known techniques of providing thermal destruction of aromatic hydrocarbons such as PCBs, dioxins, furans and polycyclic hydrocarbons, use expensive refractory materials and large amounts of energy to produce the required temperatures for the flow rates of interest.

SUMMARY OF THE INVENTION

An object of the present invention is to provide a relatively low energy, ambient temperature method of decomposing aromatic and polycyclic hydrocarbons and their chlorinated compounds.

Another object of the present invention is to provide means for decomposing a toxic aromatic hydrocarbon using electrical energy with a minimum of heating.

A further object of the present invention is to provide means for decomposing toxic aromatic hydrocarbons by breaking the benzene rings therein.

The above objects are obtained by providing an apparatus for decomposing an aromatic hydrocarbon by breaking a benzene ring therein, comprising gas supply means for supplying gases including the aromatic hydrocarbon and other substances, a pair of electrodes separated by a gap, flow producing means for producing a flow of the gases through the gap between the pair of electrodes, and electrical discharge means for establishing an electrical potential across the pair of electrodes to produce a stable glow discharge between the pair of electrodes. The electrical discharge means and flow producing means cooperate to convert the gases into a plasma, to separate or break the benzene ring into components of the aromatic hydrocarbon and to induce a reaction between the components of the aromatic hydrocarbon and at least one of the other substances present to produce nonaromatic hydrocarbons.

The pair of electrodes preferably comprises a conductive element having a planar surface and a plurality of pins disposed substantially perpendicular to the planar surface of the conductive element at a minimum distance therefrom. The electrical discharge means preferably comprises a direct current power source operatively connected to the conductive element and ballast means, operatively connected to the direct current power source and the pins, for providing ballasting.

The conductive element is preferably the anode and the pins are preferably the cathode. The minimum distance between the pins and conductive elements should be at least three (3) mm and preferably five (5) to ten (10) mm. The electrical potential established by the electrical discharge means across the pair of electrodes is preferably between ten (10) and fifteen (15) kilovolts to provide a ratio (E/N) of electrical field strength to gas density of between 50 and 200 Townsends.

The flow producing means preferably produces the flow of the gases past the electrodes at a speed of 100 meters per second at approximately atmospheric pressure. In a typical application of the present invention, the gas supply means supplies exhaust gases from an incinerator burning municipal solid waste to the flow producing means.

These objects, together with other objects and advantages which will be subsequently apparent, reside in the details of construction and operation as more fully hereinafter described and claimed, reference being had to the accompanying drawings forming a part hereof.

DESCRIPTION OF THE PREFERRED EMBODIMENT

The present invention can be used in any application in which aromatic hydrocarbons, that is, substances which contain at least one benzene ring of six carbon atoms, is desired to be broken into nonaromatic hydrocarbons which do not contain any benzene rings. Many toxic substances such as polycyclic furans, dioxins and PCBs, are chlorinated aromatic hydrocarbons and are electron-attaching species. The present invention may be used to break the benzene rings therein to produce nontoxic substances.

Figure 1:
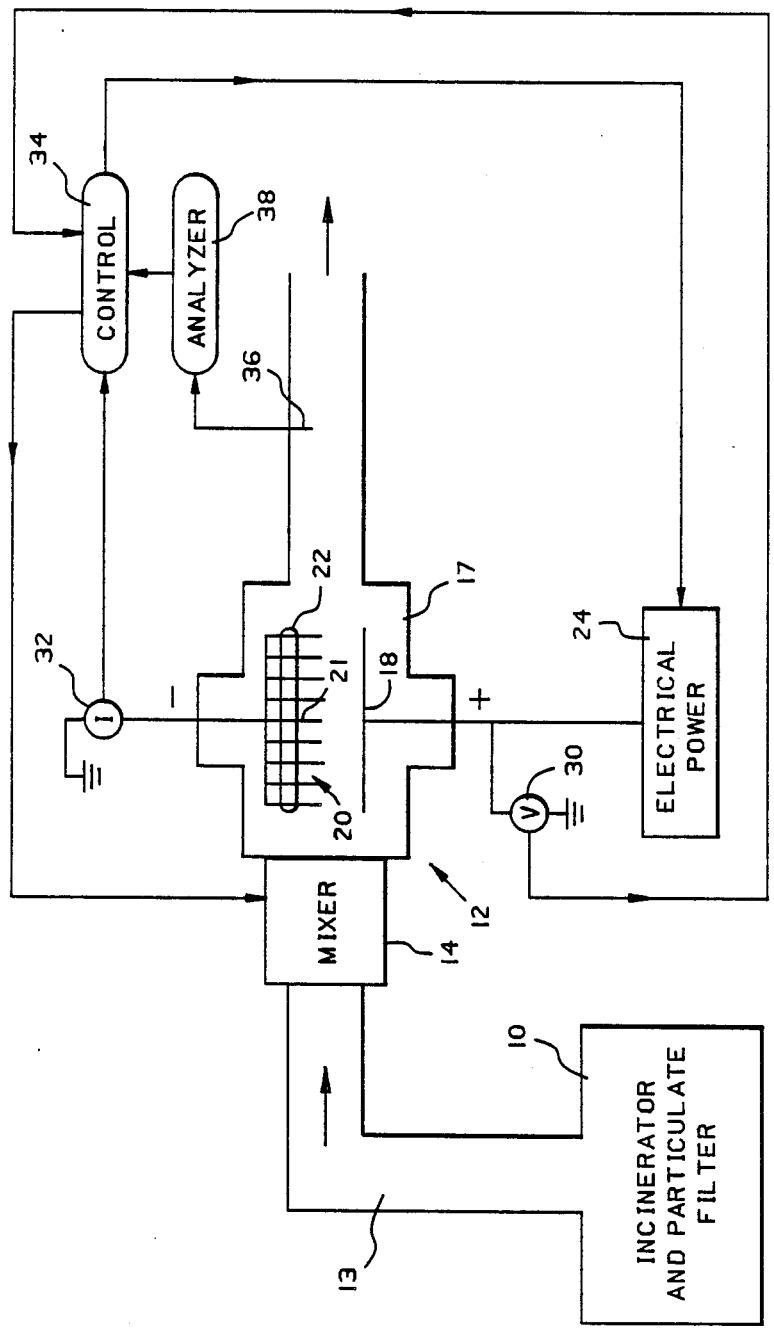
FIG. 1 is a schematic view of an apparatus according to an embodiment of the present invention for decomposing aromatic hydrocarbons.

In the embodiment illustrated in FIG. 1 the present invention is applied to the destruction of toxic aromatic hydrocarbons in the exhaust from an incinerator 10. As noted above, it is known that toxic substances such as dioxins are often found in the emissions of municipal solid waste incinerators. Due to limited space availability for landfills and leakage of toxic substances from landfills, incineration of municipal waste is a desirable alternative. It is also known that additional toxic substances, such as products of incomplete combustion (PIC's), are produced in the incineration process. However, many of the toxic substances present in incinerated municipal waste exhaust are present in such small quantities that no known gas cleanup system is capable of economically removing the toxic substances in the exhaust. As a result, incineration of municipal waste is used less often than it would be, if the exhaust were clean.

As illustrated in FIG. 1, the present invention comprises an electrochemical reactor 12 connected to receive exhaust from the incinerator and particulate filter 10. In the case of a municipal solid waste incinerator, a conventional particulate filter removes substantially all particulates from the exhaust prior to the exhaust being supplied to the electrochemical reactor 12. The particulate filter may comprise conventional devices such as a cyclone separator, a bag house, an electrostatic precipitator, etc. In addition, other devices such as scrubbers, catalytic converters, etc., may be used to remove other pollutants such as nitrous oxides, $NO_x$, and sulfurous oxides, $SO_x$, before or, depending on the pollutant, after passing through the electrochemical reactor 12. For example, an $SO_x/NO_x$ removal system such as that described in U.S. patent application Ser. No. 857,508 filed Apr. 21, 1986, now U.S. Pat. No. 4,657,738, incorporated herein by reference, may be used before or preferably after the electrochemical reactor 12.

Due to the filtering provided in the incinerator and filter 10, the exhaust pipe 13 contains primarily gases. The thus obtained input gases are preferably supplied through a mixer 14 which generates turbulence and adds any additional substances required to produce nontoxic hydrocarbons. An additional source of oxygen or other chemicals which will produce nontoxic hydrocarbons can be used, but water vapor is already present in the gas stream since steam is typically generated by the incineration process and therefore water vapor is available to provide large quantities of oxygen. In other applications, a substance such as water vapor or preheated air may need to be injected into the mixer 14 to provide chemicals which will react with the nonaromatic hydrocarbons to produce nontoxic chemicals. The injection of air is less desirable than injecting water vapor since air provides less reactive chemicals per volume. However, under some discharge conditions air may provide more of a useful, specific reactive chemical.

Figure 3:
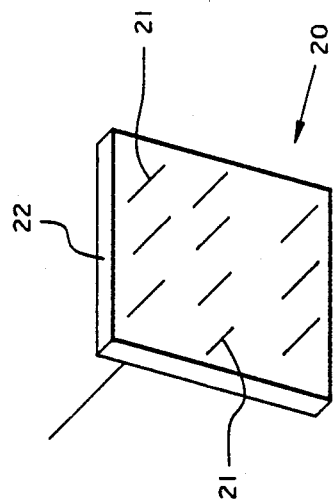
FIGS. 2 and 3 are perspective views of electrodes used in an embodiment of the present invention.
Figure 2:
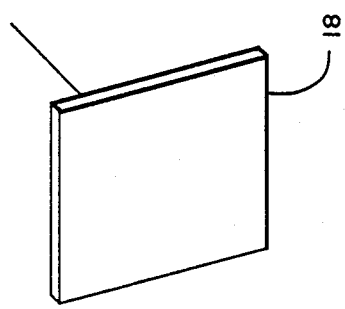

The mixture output by the mixer 14 is directed between a pair of electrodes 18 and 20 having a gap therebetween. One of the electrodes 18, preferably an anode, is formed as a rectangular plate (FIG. 3) having a surface substantially parallel to the flow of gas therethrough. The other electrode 20 preferably comprises a plurality of elongated pins 21 in a two-dimensional array (FIG. 2) disposed substantially perpendicularly to the planar surface of the anode 18. The cathode electrode 20 is ballasted by ballast means 22 which may be individual resistors or inductors (not shown) each connected at one end to a corresponding pin in the electrode 20 and commonly connected at their other ends.

In the embodiment illustrated at FIG. 1, the anode terminal 18 is connected to the positive terminal of a direct current electrical power source 24 and the cathode electrode 20 is connected via the ballast means 22 to ground. However, reversing the anode and cathode connections and the use of alternating or pulsating current are also possible. The gap between the electrodes 18 and 20 is preferably between 5 and 10 mm. If the gap is 3 mm or less, over one-half of the electrical energy may be lost in heating the anode electrode 18. This is undesirable. The high voltage direct current power source preferably generates an electrical potential across the electrodes 18 and 20 of approximately 10 to 15 kilovolts per centimeter.

The mixer 14 includes means, such as a conventional blower, to maintain the flow of gases past the electrodes 18 and 20 at a speed of greater than 30 meters per second at near atmospheric pressure. The specific number and arrangement of pins 21 in the electrode 20, the gap size, the speed of gas flow and the electrical potential are selected to maintain a stable glow discharge and to prevent arcing between the electrodes 18 and 20. The flow rate can be increased with corresponding allowable increases in electrical current and power without arcing to provide increased treatment capability.

The above-described conditions result in an E/N ratio in units of $10^{-17}$ volt-cm$^2$ (Townsends) in the plasma formed in the glow discharge unit 17 of between 50 and 200 Townsends, where E is the strength of the electric field in volt/cm and N is the number density of the gas molecules in cm$^{-3}$. Thus, a medium value E/N is present rather than a beam-like E/N such as that present in electron beam irradiation. The use of a medium value E/N provides a highly efficient transfer of energy to molecules passing through the glow discharge unit 17. As a result, the present invention decomposes chlorinated aromatic hydrocarbons with a much more efficient use of energy than destruction by heating of the molecules.

The glow discharge unit 17 generates a plasma in which the electrons are highly energized so that the benzene rings, in reacting aromatic hydrocarbons, become broken due to their relatively weak bonds. In other words, the benzene rings undergo scission. The resulting components of the aromatic hydrocarbons react with other substances in the plasma, such as atomic oxygen, excited oxygen, ozone, or hydrocarbon or other free radicals to form stable nontoxic, nonaromatic hydrocarbons or may be completely oxidized to carbon dioxide ($CO_2$) and water ($H_2O$). In an application in which the presence of oxygen is undesirably low, water vapor may be added in mixer 14 to provide a source of oxygen in the plasma.

One example of a chlorinated aromatic hydrocarbon, which can be decomposed using a device constructed according to the present invention, is trichlorobenzene. Various tests have been conducted on samples containing between approximately 25 and 130 ppm in air with and without added water vapor. These experiments were conducted using a simple glow discharge unit in which the multiconical electrical discharge volume formed between the electrode pins 21 and the anode electrode 18 comprised less than half of the available volume of the glow discharge unit 17. However, despite the limited amount of gas which was exposed to the electric field, between 41 and 67% of the trichlorobenzene was removed from the sample. It was also demonstrated in these tests that nonaromatic hydrocarbon species, such as glyoxals, which are derived specifically from broken benzene rings, could be observed in the exhaust of the glow discharge unit 17.

Based on these test results, glow discharge units constructed so that substantially all of the gas flow passes through the electric field are expected to result in decomposition of substantially all, i.e., greater than 99.9%, of an aromatic hydrocarbon. Such glow discharge units can be constructed by channelling the flow of the gas and providing the proper number and arrangement of electrodes. Some examples of electrode arrangements providing good results are disclosed in U.S. patent application Ser. No. 857,508 filed Apr. 21, 1986, now U.S. Pat. No. 4,657,738.

It is essential that arcing does not occur between the electrodes in order to practice successfully the present invention. Therefore, a voltage sensor 30 and current sensor 32 may be connected to the electrodes to supply voltage and current signals, respectively, to a control unit 34. In response to the voltage and current signals, the control unit 34 adjusts the power supplied by the electrical power source 24 or adjusts the flow of gas supplied by the mixer 14, or adjusts both, to maintain a stable glow discharge in the glow discharge unit 17. In addition, a sampling port 36 and analyzer 38 may be included to provide an indication of the presence of toxic substances in the exhaust stream, and thereby to ensure proper operation of the electrochemical reactor 12. In response to an indication that one or more toxic substances which should be destroyed by the electrochemical reactor 12 are present in the emissions from the glow discharge unit 17, the electrical power supplied from the electrical power source 24 may be increased, providing arcing does not occur, and a malfunction indication may be given to an operator if the condition persists.

A single glow discharge unit 17 is schematically illustrated in FIG. 1. However, due to the large volume of exhaust produced by a municipal solid waste incinerator and the desire to replace glow discharge units which are malfunctioning, e.g., due to an electrical fault or obstruction caused by an unfiltered particle, it is desirable to use multiple glow discharge units 17 in a modular device. The physical construction of such modules is disclosed in the related patent application Ser. No. 857,508.

Figure 4:
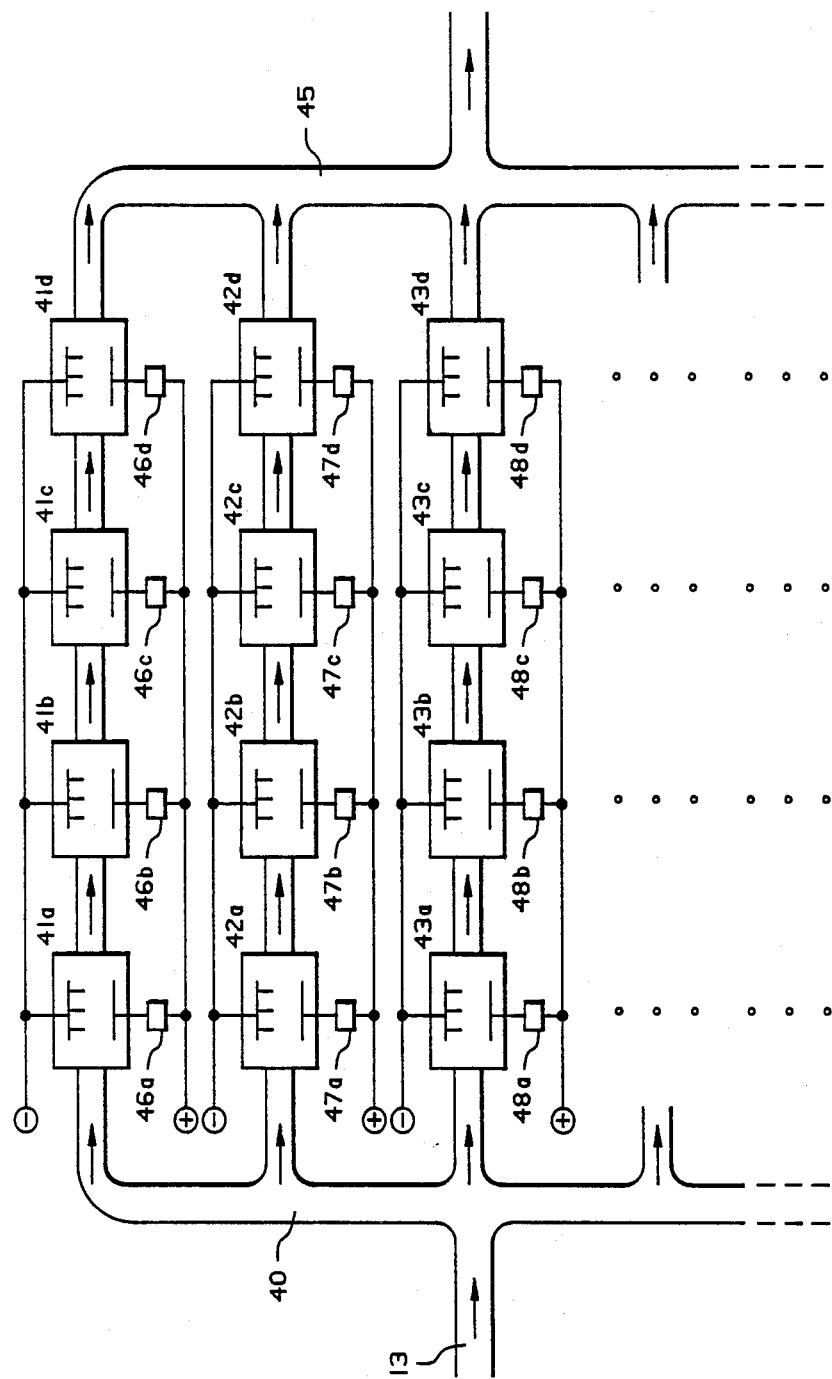
FIG. 4 is a schematic gas flow diagram for an embodiment of the present invention comprising multiple electrochemical reactors.

A schematic representation of a modular multistage embodiment is provided in FIG. 4. In the embodiment illustrated in FIG. 4, the exhaust gases in exhaust pipe 13 are distributed by a header 40 to the first column (a) of several rows (41, 42, 43, . . . ) of electrochemical reactors. In each of the rows, substantially complete elimination of aromatic hydrocarbon(s) is obtained by using multiple stages, e.g., 41a, 41b, 41c, and 41d. The conditions, such as flow rate, electrical potential, electrode pin arrangement, etc., in the electrochemical reactors in each of these stages is tailored to the concentration of the aromatic hydrocarbon present at that stage. p The flow rate may be kept substantially constant, as illustrated in FIG. 4. In this case, the electrical potential across the electrodes in each of the stages 41a through 43d is individually determined by respective control units 46a through 48d. The control provided by control units 46a through 48d may be static, e.g., resistors of varying resistance may be used with control units 46a, 47a and 48a providing a direct connection and, for example, the resistance in 46d being greater than the resistance in 46c, which in turn is greater than the resistance in 46b.

Alternatively, very precise control can be provided by using control units which sense arcing in the corresponding electrochemical reactor stages and reduce the voltage across the electrodes in response thereto. After arcing stops, the voltage may be either grdually increased or increased in response to a signal from an analyzer indicating that the corresponding electrochemical reactor stage or a row of stages is sensing an excessive amount of aromatic hydrocarbon. The use of multiple stages, each designed to efficiently remove the concentration of hydrocarbons present at that stage, results in substantially complete elimination of toxic aromatic hydrocarbons.

The stages are preferably grouped in modules for ease of maintenance. Each module may include one stage in each of several flow paths, e.g., a module comprising stages 41a, 42a, 43a, etc. However, it is preferable to have the modules form a complete flow path, e.g., 41a, 41b, 41c and 41d, so that a single analyzer (not shown in FIG. 4, but corresponding to analyzer 38 in FIG. 1) at the end of each flow path can be used to detect inoperative conditions in that flow path. Thus, when a failure is detected, the entire module comprising that flow path or row, e.g., all 41's, can be replaced with a new module.

Figure 5:
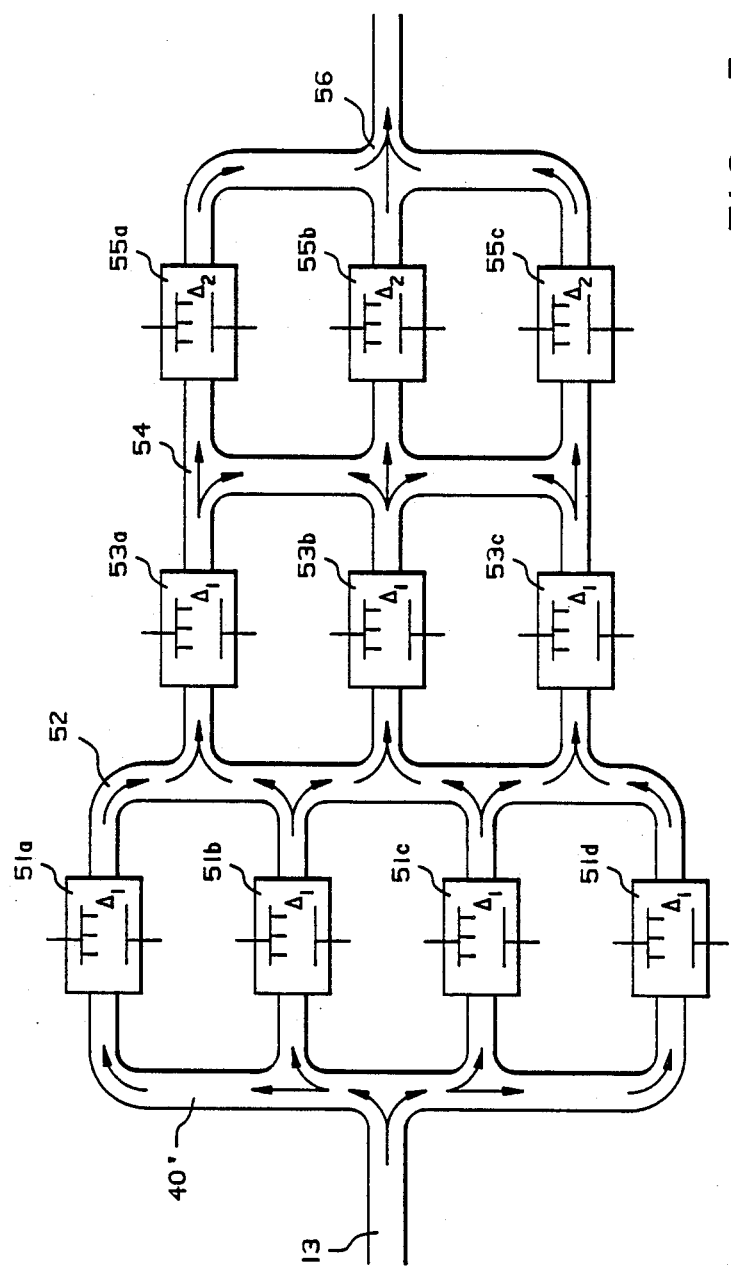
FIG. 5 is a schematic gas flow diagram for another embodiment of the present invention comprising multiple electrochemical reactors.

As an alternative to the rectangular array of electrochemical reactors illustrated in FIG. 4, the electrochemical reactors can be arranged as illustrated in FIG. 5. Since the concentration of aromatic hydrocarbons is reduced at each stage, and the electronegativity of these contaminants help determine the gap potential, little or no reduction in electrical potential across the electrodes may be required if the flow rate is increased. Identical electrochemical reactors may be used in each stage, provided the flow rate is increased by decreasing the number of electrochemical reactors in a stage. Alternatively, the gap size can be decreased in later stages to increase the flow rate. In the embodiment illustrated in FIG. 5, both of these techniques are used and an excessive pressure drop is avoided.

Four electrochemical reactors 51a–51d comprise the first stage in the embodiment of FIG. 5 and typically will decompose over 90% of aromatic hydrocarbons in the exhaust. The first stage reactors 51a–51d are connected via a header 52 to three second stage electrochemical reactors 53a–53c. Similarly, header 54 connects the second stage reactors 53a–53c to third stage reactors 55a, 55b and 55c, and header 56 supplies a very low concentration of aromatic hydrocarbons to any successive electrochemical reactors (not shown) or to the exhaust. The electrode gap $\Delta_1$ is the same in the first and second reactors 51a–51d and 53a–53d, but a smaller gap $\Delta_2$ is used in the third stage reactors 55a–55c.

In some applications, the increase in flow rate caused by the illustrated 4:3 reduction in reactors between stages 1 and 2 and reduction in gap size between stages 2 and 3 would likely be insufficient to provide ideal conditions in each stage. Depending on the application, it may be possible to modify the number of reactors per stage and the gap size to provide flow rates which permit the electrical potential across the electrodes in each of the electrochemical reactors to be substantially the same. If necessary, the electrical potential can also be varied in addition to the change in flow rate. For example, the electrodes in electrochemical reactors 51a–51d in the first stage could be connected in parallel with each other. The electrodes in electrochemical reactors 53a–53c in the second stage may be connected in series with each other and in parallel with each of the electrodes in reactors 51a–51d. Thus, the electrical potential across the electrodes in electrochemical reactors 53a–53c would be approximately one-third the potential across the electrodes in each of the electrochemical reactors 51a–51d in the first stage. In addition, individual control of the electrochemical reactors in the embodiment illustrated in FIG. 5 could be performed using control units like control units 46a through 48d described above with respect to FIG. 4.

The ability of the present invention to decompose one aromatic hydrocarbon, trichlorobenzene, has been demonstrated successfully. Relatively minor adjustments to the E/N ratio, within the range of 50 to 200 Townsends, and to the flow rate, results in a device capable of decomposing other aromatic hydrocarbons, including polycyclic furans, such as dibenzofuran; dioxins, such as dibenzo-p-dioxin; and PCBs, such as tetrachlorobiphenyl, pentachlorobiphenyl and decachlorobiphenyl. Tuning of the device for a specific chemical present in an exhaust stream can be provided by one of ordinary skill in the art. The process of setting the flow rate and electrical potential is simplified by including the automatic control unit 34 to prevent arcing and performing at least periodic sampling to detect the presence of toxic chemicals in the emissions from the glow discharge unit 17.

Furthermore, the present invention is applicable not only to treatment of incinerated municipal waste exhaust in which toxic substances are present in minute amounts, but also as a substitute for high temperature incineration of highly concentrated toxic wastes. In such an application, it is only necessary to generate a gaseous stream with an appropriate mixture of aromatic hydrocarbons and other substances to produce nontoxic, nonaromatic hydrocarbons in the emissions from glow discharge units.

The many features and advantages of the present invention are apparent from the detailed specification, and thus, it is intended by the appended claims to cover all such features and advantages of the device which fall within the true spirit and scope of the invention. Further, since numerous modifications and changes will readily occur to those skilled in the art, it is not desired to limit the invention to the exact construction and operation illustrated and described. Accordingly, all suitable modifications and equivalents for decomposing aromatic hydrocarbons may be resorted to falling within the scope and spirit of the invention.

What is claimed is:

1. A method of decomposing an aromatic hydrocarbon by breaking a benzene ring therein, comprising the steps of:
   (a) distributing input gases, containing an aromatic hydrocarbon and other substances, into plural parallel flow paths;
   (b) directing the input gases in each of the flow paths between a first pair of electrodes in a corresponding first stage of each of the flow paths;
   (c) establishing a first electrical potential across the first pair of electrodes in each of the first stages to produce a glow discharge increasing the energy level in a portion of the input gases sufficiently to cause scission of the benzene ring into components of the aromatic hydrocarbon and reaction of the components of the aromatic hydrocarbon with at least one of the other substances to produce nonaromatic hydrocarbons;
   (d) supplying first output gases from the first stage in each flow path to a second stage containing a second pair of electrodes between which the first output gases pass; and
   (e) establishing a second electrical potential across the second pair of electrodes in the second stage to produce a glow discharge increasing the energy level in a portion of the first output gases sufficiently to cause scission of the benzene ring in a portion of the input gases unaffected by the first stages into the components of the aromatic hydrocarbon and reaction of the components of the aromatic hydrocarbon with at least one of the other substances to produce more of the nonaromatic hydrocarbons.

2. A method of decomposing an aromatic hydrocarbon by breaking a benzene ring therein, comprising the steps of:
   (a) distributing input gases, containing an aromatic hydrocarbon and other substances, into plural parallel flow path;
   (b) directing the input gases in each of the flow paths between a first pair of electrodes in a corresponding first stage of each of the flow paths;
   (c) establishing and individually controlling a first electrical potential across the first pair of electrodes in each of the first stages to produce a glow discharge without arcing, the glow discharge increasing the energy level in a portiion of the input gases sufficiently to cause scission of the benzene ring into components of the aromatic hydrocarbon and reaction of the components of the aromatic hydrocarbon with at least one of the other substances to produce nonaromatic hydrocarbons;
   (d) supplying first output gases from the first stage in each flow path to a second stage containing a second pair of electrodes between which the first output gases pass; and
   (e) establishing and individually controlling a second electrical potential across the second pair of electrodes in the second stage to produce a glow discharge without arcing, the glow discharge increasing the energy level in a portion of the first output gases sufficiently to cause scission of the benzene ring in a portion of the input gases unaffected by the first stages into the components of the aromatic hydrocarbon and reaction of the components of the aromatic hydrocarbon with at least one of the other substances to produce more of the nonaromatic hydrocarbons.

* * * * *